United States Patent Office 2,819,273
Patented Jan. 7, 1958

2,819,273

HETEROCYCLIC NITROGEN-CONTAINING COMPOUNDS HAVING A 3:4:5-TRIMETHOXYBENZOYL SUBSTITUENT

David John Drain and Haydn Windsor Richard Williams, Welwyn Garden City, England, assignors to T. J. Smith & Nephew Limited, Yorkshire, England, a British company No Drawing. Application October 2, 1956, Serial No. 613,367

4 Claims. (Cl. 260—294.3)

The present invention relates to heterocyclic nitrogen-containing compounds having a 3:4:5-trimethoxybenzoyl substituent.

The object of the invention is to produce therapeutic compounds which are effective for the treatment of hypertension. It is a further object to produce therapeutic compounds which when administered have a tranquilising effect. It is a still further object of the invention to produce compounds which are structurally related to the active ingredient of Rauwolfia known as Reserpine by a relatively simple series of reactions.

With these and other objects we have made compounds of the general formula:

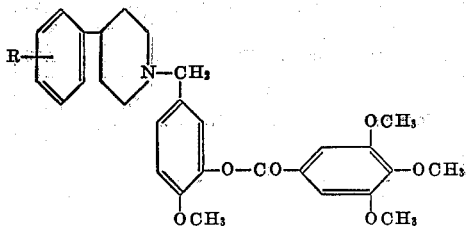

wherein R is a hydrogen atom or an alkoxy or alkylenedioxy group, such as methoxyl or methylenedioxyl.

It will be seen that these compounds are heterocyclic nitrogen-containing compounds having a 3:4:5-trimethoxybenzoyl substituent and that they resemble Reserpine in their orientation.

According to the process of the present invention, the compounds of general Formula I are prepared by condensing phenylglutaric anhydride or a nuclear substituted phenylglutaric anhydride with isovanillylamine, reducing the resulting glutarimide to the corresponding piperidine compound, e. g. with lithium aluminum hydride, and then acylating the hydroxyl group of the isovanillyl residue with a reactive derivative of 3:4:5-trimethoxybenzoic acid, such as the acid chloride.

The reaction proceeds as follows:

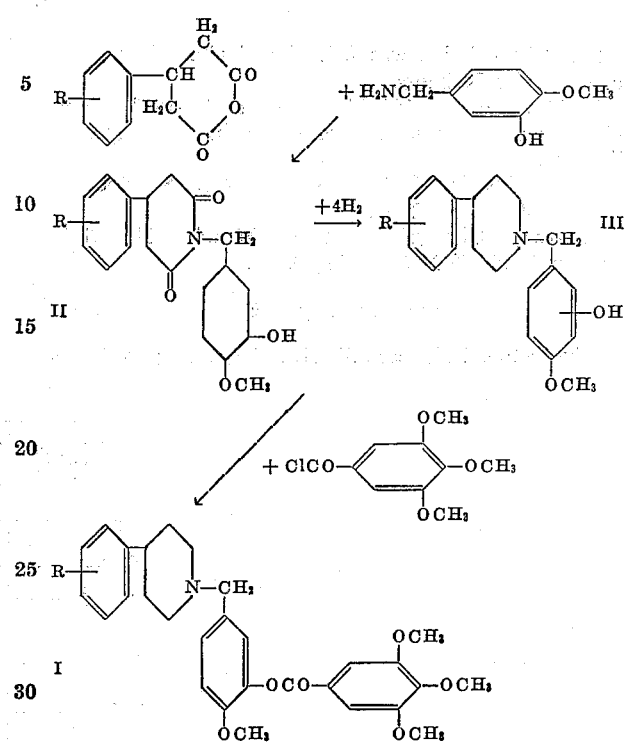

The invention also includes the intermediates of the general Formula III.

EXAMPLE (a) *Isovanillylamine hydrochloride* (see Challis and Clemo J. C. S., (1947), 615).

Isovanillin oxime (50 gms.) was dissolved in methanol (450 ml.) and water (300 ml.) was added. Sodium amalgam (700 gms. 4%) was added in small pieces with stirring over a period of an hour. During the addition of the amalgam, the pH of the reaction mixture was maintained slightly acid (5.5–6.5) by the addition of 50% acetic acid and the temperature was kept below 35° C. by external cooling.

When the reduction had been completed, the solution was decanted from the mercury, filtered and acidified to Congo Red with concentrated hydrochloric acid. The solution was evaporated to dryness under reduced pressure in a water bath at 60° C. and the residue was extracted with boiling methylated spirit (250 ml.). After removing the sodium chloride, the alcohol extract was evaporated to a syrup under reduced pressure and the residue was dissolved in boiling methylated spirit (200 ml.). The solution was filtered and allowed to stand at 0° C. for 24 hours.

Yield 32–36 gms. (56–64%), M. Pt. 188–191° C. (including a second crop obtained by working up the mother liquors).

Recrystallisation from ethanol/ether gave colourless crystals M. Pt. 190–2° C.

$C_8H_{12}O_2$ NCl requires C 50.6% H 6.4% Cl 18.7%. Found: C 50.9% H 6.2% Cl 19.1%.

(b) *Isovanillylamine*

The hydrochloride was dissolved in water (5 volumes and the theoretical quantity of 5 N sodium hydroxide solution was added with stirring. The product was filtered off and dried in a vacuum desiccator over phosphorus pentoxide. 90–95%, M. Pt. 153–158° C.

Purified by recrystallisation from ethanol and sublimation under reduced pressure. M. Pt. 156–160° C.

$C_8H_{11}O_2N$ requires C 62.6% H 7.18%. Found C 62.9% H 7.29%.

(c) *Substituted-phenyl glutarimides (II)*.

Isovanillylamine (0.03 mole) and the β-substituted-phenyl-glutaric anhydride (0.03 mole) were added to xylene (90 ml.) and the mixture was refluxed under a water-separator for 24 hours. The hot xylene solution was decanted from tarry impurities and on cooling the bulk of the product crystallised or was deposited as a sticky syrup. It was recrystallised from ethyl alcohol.

The following are details of products so obtained.

[1] This product crystallises from ethyl acetate/petroleum ether as colourless platelets. M. P 104–105° C.

(d) *Substituted phenyl piperidines (III)*

The finely powdered glutarimide (0.04 mole) was added in small portions during 8 hours to a boiling slurry of lithium aluminium hydride (4.57 gm. 0.12 mole) in absolute ether (900 ml.). After boiling the mixture for a further 16 hours, the excess hydride was decomposed by the addition of water (4.5 ml.) followed by acetic acid (7.2 gms. 0.12 mole). The ether suspension was filtered and evaporated to dryness. In some cases a further quantity of product could be obtained by extracting the filter cake with ethyl acetate. It was recrystallised from ethyl alcohol.

The following are details of the products so obtained.

(e) *3:4:5-trimethoxybenzoylated products (I)*

The 1-(3-hydroxy-4-methoxybenzyl) piperidine was dissolved in dry pyridine (2½–3 vols.) and 3:4:5-trimethoxybenzoyl chloride (1.05 molar proportions) was added in small portions with agitation. The reaction mixture was allowed to stand at room temperature for 3 hours and was then poured into water (ca. 30 volumes). In some cases the precipitated product could be obtained crystalline by triturating with a little alcohol and a second crop could be obtained by extracting the aqueous solution with ether, while in other cases it was necessary to take the whole of the product into ether and wash out most of the pyridine with water before the product could be induced to crystallise.

The following are details of the products so obtained.

| Substituent on the phenyl ring | Crude, Yield Percent | Recrystallised | | Analysis | | |
|---|---|---|---|---|---|---|
| | | Appearance | M. P., °C. | | Requires | Found |
| None | 78 | Colourless crystals from ethanol or cyclohexane/ethyl-acetate. | 94–95 | C H N | 70.9 6.76 2.85 | 70.9 6.78 2.8 |
| 4—OCH₃ | 76 | Needles from ethanol | 109.5–110 | C H N | 69.1 6.76 2.7 | 68.7 6.75 3.1 |
| 3—OCH₃ | 61 | Colourless plates from ethanol. | 115.5–116 | C H N | 69.1 6.76 2.7 | 68.9 6.7 2.6 |
| 2—OCH₃ | 61 | ----do---- | 118.5–119 | C H N | 69.1 6.76 2.7 | 69.2 6.46 2.7 |
| 3:4 —O\CH₂/—O | 54 | Colourless crystals from methanol. | 99–100 | C H N | 67.3 6.21 2.6 | 67.4 6.31 2.7 |

We claim:
1. The compounds of the general formula:

wherein R represents a monovalent substituent selected from the group consisting of hydrogen atoms, methoxy groups and methylenedioxy groups.

2. The compounds of the general formula:

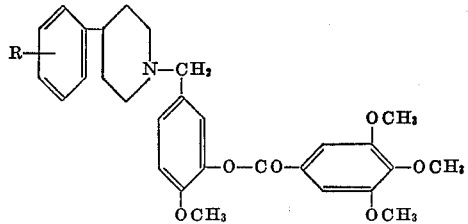

wherein R represents a monovalent substituent selected from the group consisting of hydrogen atoms, methoxy groups and methylenedioxy groups.

3. The compounds of the general formula:

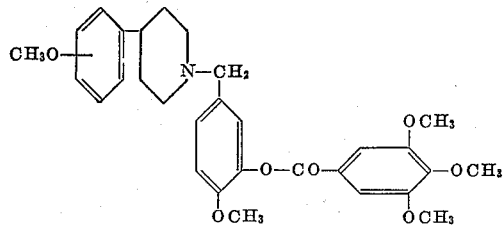

4. The compounds of the general formula:

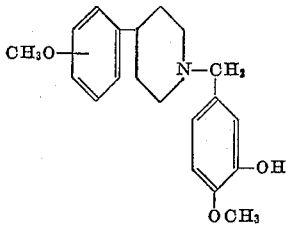

No references cited.